United States Patent
Shimada

[19]

[11] Patent Number: 6,123,467
[45] Date of Patent: Sep. 26, 2000

[54] LINK MECHANISM SHUTTER DEVICE

[75] Inventor: Fumio Shimada, Chichibu, Japan

[73] Assignee: Canon Denshi Kabushiki Kaisha, Saitama-ken, Japan

[21] Appl. No.: 09/130,238

[22] Filed: Aug. 6, 1998

[30] Foreign Application Priority Data

Aug. 29, 1997 [JP] Japan .................................. 9-233857

[51] Int. Cl.⁷ ..................................................... G03B 9/08
[52] U.S. Cl. ........................................... 396/452; 396/456
[58] Field of Search ..................................... 396/452, 483, 396/484, 488, 489, 493, 495, 497, 500, 456

[56] References Cited

U.S. PATENT DOCUMENTS

| | | | |
|---|---|---|---|
| 4,975,722 | 12/1990 | Suzuki et al. ............................ | 354/246 |
| 5,214,463 | 5/1993 | Ishida et al. ............................. | 396/487 |
| 5,420,654 | 5/1995 | Tanabe et al. ............................ | 396/493 |
| 5,475,459 | 12/1995 | Matsubara et al. ...................... | 354/246 |

*Primary Examiner*—Russell Adams
*Assistant Examiner*—Hung Henry Nguyen
*Attorney, Agent, or Firm*—Robin, Blecker & Daley

[57] ABSTRACT

A shutter device functioning as a focal-plane shutter device for cameras, includes a shutter blade, a base plate, a first arm member and a second arm member. The first arm member has one end portion rotatably fitted to the shutter blade and further has the other end portion rotatably fitted to the base plate, while the second arm member has one end portion rotatably fitted to the shutter blade and further has the other end portion rotatably fitted to said base plate. In this shutter device, the distance between the center of rotation of the first arm member with respect to the shutter blade and the center of rotation of the second arm member with respect to the shutter blade is set to be different from the distance between the center of rotation of the first arm member with respect to the base plate and the center of rotation of the second arm member with respect to the base plate.

6 Claims, 5 Drawing Sheets

LINK MECHANISM SHUTTER DEVICE

BACKGROUND OF THE INVENTION

1. Field of the Invention

The present invention relates to a focal-plane shutter device for cameras.

2. Description of Related Art

Heretofore, for many cameras, there has been widely employed a focal-plane shutter device in which a plurality of arms are used to constitute a parallel link mechanism and shutter blades (a leading shutter blade and a trailing shutter blade) for forming a slit are fitted to fore ends of the arms. In such a focal-plane shutter device, the leading shutter blade, which has been covering a shutter opening, travels toward an end of the shutter opening to expose the shutter opening, and, after the lapse of a predetermined period of time according to a shutter speed, the trailing shutter blade, which has been opening the shutter opening, travels toward the end of the shutter opening to cover the shutter opening, so that a slit defined between the leading shutter blade and the trailing shutter blade shifts from one end of the shutter opening to the other end thereof to supply necessary exposure light to a photographing image plane of film.

Such a focal-plane shutter device is carefully manufactured in such a manner as to make uniform the movement characteristics of the leading shutter blade and the trailing shutter blade, particularly the movement characteristics of slit-forming edges thereof for exposure, for the time period from the exposure start to the exposure end, in order to prevent the occurrence of the unevenness of exposure over the whole photographing image plane. In addition, the conventional focal-plane shutter device is manufactured on the assumption that the slit-forming edges move in parallel with each other in accordance with the driving of both the shutter blades by the parallel link mechanism.

However, a play (fitting gap) is formed in a fitting section between the fore end of the arm and the shutter blade or a fitting section between a base end of the arm and a base plate of the shutter, so as to make smooth movement of each shutter member. For this reason, even if the shutter blades are driven by using the parallel link mechanism, practically the slit-forming edges of the shutter blades do not move in parallel with each other, so that the exposure in the longitudinal directions (traverse directions in the case of a vertical-travel-type focal-plane shutter device) of the slit cannot be made uniform, thus leading to the unevenness of exposure.

Here, referring to FIGS. 3A to 3C, FIGS. 4A to 4C and FIGS. 5A to 5C, a description will be made hereinbelow of a mechanism for the occurrence of the unevenness of exposure in transverse directions. FIGS. 3A to 3C are illustrations of an ideal condition of no unevenness of exposure in transverse directions in the case of a vertical-travel-type focal-plane shutter device. Although the leading shutter blade and the trailing shutter blade originally take an accelerated motion, the description will be taken on the assumption that each of the shutter blades takes a uniform-speed motion for simplicity.

In FIGS. 3A, 3B and 3C, reference numeral 101 denotes a shutter opening provided in a shutter base plate (not shown), and reference numerals 102 and 103 denote a main arm and a sub-arm for travel-driving a leading shutter blade 104, respectively. Base end portions of the main arm 102 and the sub-arm 103 are rotatably fitted to the shutter base plate in such a way that shafts 105 and 106 mounted on the shutter base plate are fitted into holes 102a and 103a, respectively. Further, the leading shutter blade 104 is rotatably fitted to the fore end portions of the main arm 102 and the sub-arm 103 in such a way that dowels 107 and 108 mounted on the leading shutter blade 104 are fitted into holes 102b and 103b, respectively.

The distance between the rotating shafts on the side of the base end portions of the main arm 102 and the sub-arm 103 (the distance between the shaft 105 and the shaft 106) is equal to the distance between the fitting shafts of the leading shutter blade 104 on the side of the fore end portions of the main arm 102 and the sub-arm 103 (the distance between the dowels 107 and 108), and a parallel link is constructed by the main arm 102 and the sub-arm 103.

The leading shutter blade 104, which is one of a plurality of light-shielding blades, is a member for forming a slit for exposure.

On the other hand, reference numerals 109 and 110 denote a main arm and a sub-arm for travel-driving a trailing shutter blade 111, respectively. Base end portions of the main arm 109 and the sub-arm 110 are rotatably fitted to the shutter base plate in such a way that shafts 112 and 113 mounted on the shutter base plate are fitted into holes 109a and 110a, respectively. Further, the trailing shutter blade 111 is rotatably fitted to the fore end portions of the main arm 109 and the sub-arm 110 in such a way that dowels 114 and 115 mounted on the trailing shutter blade 111 are fitted into holes 109b and 110b, respectively.

The distance between the rotating shafts on the side of the base end portions of the main arm 109 and the sub-arm 110 (the distance between the shaft 112 and the shaft 113) is equal to the distance between the fitting shafts of the trailing shutter blade 111 on the side of the fore end portions of the main arm 109 and the sub-arm 110 (the distance between the dowels 114 and 115), and, thus, a parallel link is constructed by the main arm 109 and the sub-arm 110.

The trailing shutter blade 111, which is one of the plurality of light-shielding blades, is a member for forming a slit for exposure.

In the ideal type shown in FIGS. 3A, 3B and 3C, no fitting play (fitting gap) exists in each of the fitting sections, that is, between each of the holes 102a, 103a, 102b, 103b and the corresponding one of the shafts 105, 106 and dowels 107, 108 fitted therein or between each of the holes 109a, 110a, 109b, 110b and the corresponding one of the shafts 112, 113 and dowels 114, 115 fitted therein. Accordingly, from a state near the exposure start shown in FIG. 3A through a state in process of exposure shown in FIG. 3B up to a state near the exposure end shown in FIG. 3C, slit-forming edges 104a and 111a of the leading shutter blade 104 and the trailing shutter blade 111 are kept to be in parallel with each other, thus producing no unevenness of exposure in the transverse directions.

However, in the case of the actual products of focal-plane shutter devices, since the fitting play is made in the fitting sections as mentioned before, as shown in FIGS. 4A to 4C and in FIGS. 5A to 5C, difficulty is encountered to maintain the slit-forming edges 104a and 111a of the leading shutter blade 104 and the trailing shutter blade 111 to be in parallel with each other, which causes the unevenness of exposure in the transverse directions.

FIGS. 4A, 4B and 4C show the variation in the inclination of the slit-forming edge 104a of the leading shutter blade 104. In a state near the exposure start shown in FIG. 4A, when a driving force is transferred from a drive lever (not shown) engaging with a driving force transmission hole 102c of the main arm 102 to the main arm 102, the main arm 102 receives a force to rotate clockwise around the shaft 105, with the result that a force indicated by an arrow F1 works on the dowel 107 of the leading shutter blade 104, which is fitted in the hole 102b of the main arm 102 with a fitting play existing therebetween.

When the force indicated by the arrow F1 works, the leading shutter blade 104 tends to stay at that position due to the large-load static frictional force and the inertia force thereof about the center of gravity G1. In addition, due to the load (inertial force) of the sub-arm 103, a force for causing the leading shutter blade 104 to rotate counterclockwise works on the dowels 107 and 108. For this reason, owing to the play within the link system, the leading shutter blade 104 (slit-forming edge 104a) starts to travel, in an inclined state with its right-hand section raised with respect to the end portion of the shutter opening 101, as shown in FIG. 4A.

Then, in a state in process of exposure shown in FIG. 4B, the force for causing the shutter leading blade 104 to rotate generated by the load of the sub-arm 103 due to the force working from the main arm 102 onto the dowel 107 balances with the centrifugal force working on the leading shutter blade 104, so that the leading shutter blade 104 (slit-forming edge 104a) travels in a state of being in parallel with the end portion of the shutter opening 101. Incidentally, with this state as the boundary, the force working on the leading shutter blade 104 changes from the counterclockwise force to the clockwise force.

Subsequently, in a state near the exposure end shown in FIG. 4C, the force for causing the leading shutter blade 104 to rotate clockwise working from the sub-arm 103 onto the dowel 108 due to the force of the arrow F1 working from the main arm 102 onto the dowel 107 (i.e., the force occurring by the load of the sub-arm 103), and the centrifugal force working clockwise on the leading shutter blade 104 are given to the leading shutter blade 104. Therefore, owing to the play within the link system, the leading shutter blade 104 (slit-forming edge 104a) terminates the travelling, in an inclined state with its right-hand section lowered.

FIGS. 5A, 5B and 5C show the variation in the inclination of the slit-forming edge 111a of the trailing shutter blade 111. In a state near the exposure start shown in FIG. 5A, when a driving force is transferred from a drive lever (not shown) engaging with a driving force transmission hole 109c of the main arm 109 to the main arm 109, the main arm 109 receives a force to rotate clockwise around the shaft 112, with the result that a force indicated by an arrow F2 works on the dowel 114 of the trailing shutter blade 111, which is fitted in the hole 109b of the main arm 109 with a fitting play existing therebetween.

When the force indicated by the arrow F2 works, the trailing shutter blade 111 tends to stay at that position by the static frictional force and the inertial force of the trailing shutter blade 111 about the center of gravity G2, and hence, a force to rotate the trailing shutter blade 111 counterclockwise works on the dowel 114 of the trailing shutter blade 111. However, when the force indicated by the arrow F2 works, due to the load (inertia force) of the sub-arm 110, a force occurs to rotate the trailing shutter blade 111 clockwise about the dowel 115 of the trailing shutter blade 111, thereby offsetting the above counterclockwise rotating force. Therefore, even if the fitting play exists within the link system, the trailing shutter blade 111 (slit-forming edge 111a) starts to travel, in a state of being in parallel with the end portion of the shutter opening 101.

Then, in a state in process of exposure shown in FIG. 5B, since a balance is kept among the force working from the main arm 109 onto the dowel 114, the force generated by the load of the sub-arm 110 to rotate the trailing shutter blade 111 and the centrifugal force working on the trailing shutter blade 111, the trailing shutter blade 111 (slit-forming edge 111a) travels in a state of being in parallel with the end portion of the shutter opening 101.

Subsequently, in a state near the exposure end shown in FIG. 5C, although a force to rotate the trailing shutter blade 111 counterclockwise working on the dowel 115 from the sub-arm 110 due to the force of the arrow F2 working from the main arm 109 onto the dowel 114 (i.e., the force generated by the load of the sub-arm 110) is given to the trailing shutter blade 111, it is offset by the centrifugal force for causing the trailing shutter blade 111 to rotate clockwise. For this reason, even if a fitting play exists within the link system, the trailing shutter blade 111 (slit-forming edge 111a) terminates the travelling, in a state of being in parallel with the end portion of the shutter opening 101.

As described above, the slit-forming edge 104a of the leading shutter blade 104 takes an inclined state with its right-hand section raised with respect to the end portion of the shutter opening 101 in the vicinity of the travel start, becomes parallel with the end portion of the shutter opening 101 in the middle of the traveling, and assumes an inclined state with its right-hand section lowered in the vicinity of the travel end. On the other hand, the slit-forming edge 111a of the trailing shutter blade 111 is substantially in parallel with the end portion of the shutter opening 101 from the travel start up to the end. Therefore, a left and upper portion and a right and lower portion of the photographing image plane result in the overexposure condition with respect to a central portion thereof.

Further, although the unevenness of exposure thus occurring does not create a big problem in the case of a conventional low-speed shutter in which a slit width is made relatively wide, it causes a serious problem in the case of a high-speed shutter in which a slit width is made considerably narrow (whose maximum speed is 1/8000 seconds or higher).

BRIEF SUMMARY OF THE INVENTION

Accordingly, the present invention has been developed with a view to eliminating the above-mentioned problem, and it is an object of the present invention to provide a shutter device which is capable of enhancing the traveling accuracy of a shutter blade.

To attain the above object, in accordance with one aspect of the present invention, there is provided a shutter device comprising a shutter blade, a base plate, a first arm member whose one end portion is rotatably fitted to the shutter blade and whose other end portion is rotatably fitted to the base plate, and a second arm member whose one end portion is rotatably fitted to the shutter blade and whose other end portion is rotatably fitted to the base plate, wherein a distance between the center of rotation of the first arm member with respect to the shutter blade and the center of rotation of the second arm member with respect to the shutter blade is set to be different from a distance between the center of rotation of the first arm member with respect to the base plate and the center of rotation of the second arm member with respect to the base plate, so that the accuracy of traveling of the shutter blade can be improved.

The above and further objects and features of the present invention will become apparent from the following detailed description of a preferred embodiment thereof taken in conjunction with the accompanying drawings.

DETAILED DESCRIPTION OF THE INVENTION

Hereinafter, a preferred embodiment of the present invention will be described in detail with reference to the drawings.

FIGS. 1A to 1C and FIGS. 2A to 2C show a leading shutter blade driving section of a focal-plane shutter device for a camera according to an embodiment of the present invention.

Figure 1A:
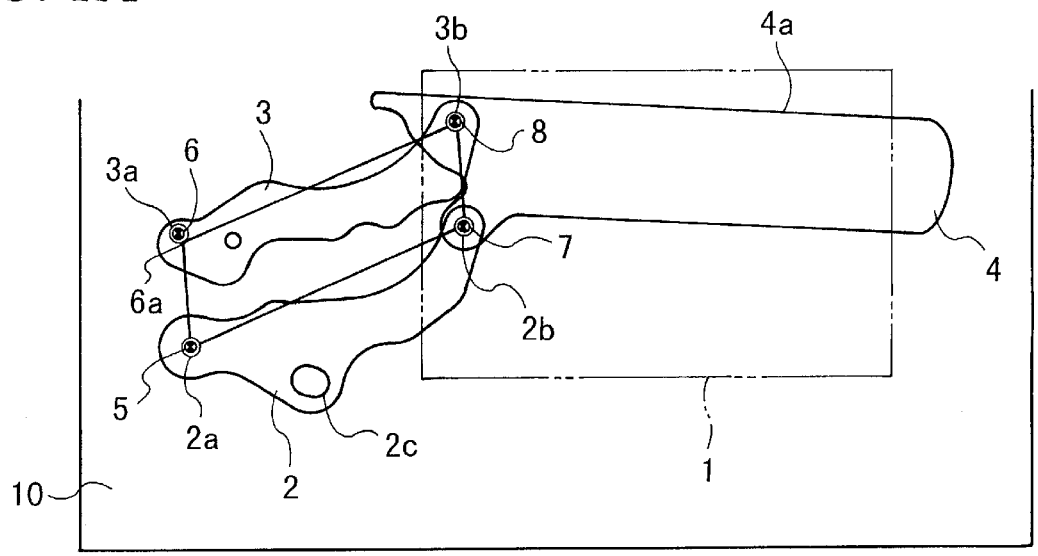
FIGS. 1A, 1B and 1C are illustrations useful for explaining an operation of a leading shutter blade driving section (ideally designed so as not to have a play within a link system) of a focal-plane shutter device according to an embodiment of the present invention.
Figure 1B:
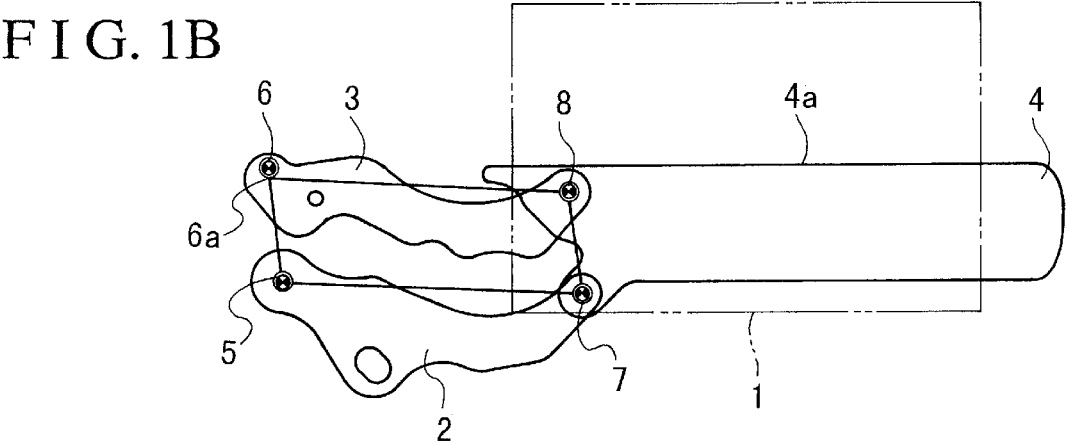
Figure 1C:
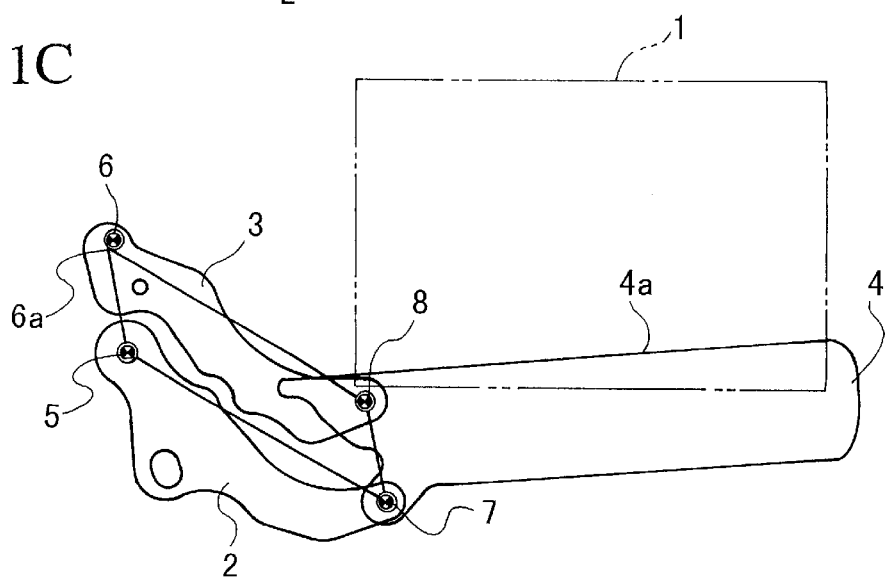

First, in FIGS. 1A to 1C, there is illustrated a leading shutter blade driving section which is ideally designed so that no fitting play (fitting gap) exists in a section constituting a link for travel-driving a leading shutter blade 4.

Referring to FIGS. 1A to 1C, reference numeral 1 denotes a shutter opening provided in a shutter base plate 10, and reference numerals 2 and 3 denote a main arm and a sub-arm for travel-driving the leading shutter blade 4, respectively. Base end portions of the main arm 2 and the sub-arm 3 are rotatably fitted to the shutter base plate 10 in such a way that shafts 5 and 6 mounted on the shutter base plate 10 are fitted in holes 2a and 3a, respectively. Further, the leading shutter blade 4 is rotatably fitted to the fore end portions of the main arm 2 and the sub-arm 3 in such a way that dowels 7 and 8 mounted on the leading shutter blade 4 are fitted in holes 2b and 3b, respectively.

The distance between the rotating shafts on the side of the base end portions of the main arm 2 and the sub-arm 3 (the distance between the shaft 5 and the shaft 6) is made to be longer than the distance between the fitting shafts of the leading shutter blade 4 on the side of the fore end portions of the main arm 2 and the sub-arm 3 (the distance between the dowels 7 and 8), and, thus, a non-parallel link is constructed by the main arm 2 and the sub-arm 3. Concretely describing, the position of the shaft 6 of the sub-arm 3 is shifted upward with respect to the position of an imaginary shaft 6a which is to be used for constituting a parallel link.

The leading shutter blade 4, which is one of a plurality of leading shutter light-shielding blades, is a member for forming a slit for exposure.

The leading shutter blade driving section ideally designed as mentioned above is constructed in such a manner that, in a state near the exposure start shown in FIG. 1A, the leading shutter blade 4 (slit-forming edge 4a) takes an inclined state with its right-hand section lowered.

Then, the imaginary shaft 6a constituting the parallel link moves around the actual shaft 6 toward such a position that the leading shutter blade 4 (slit-forming edge 4a) becomes parallel with an end portion of the shutter opening 1, as shown in FIG. 1B, and hence, the right-hand section of the leading shutter blade 4 gradually rises. When the leading shutter blade 4 passes the position where it becomes parallel with the end portion of the shutter opening 1 and then reaches a state near the exposure end shown in FIG. 1C, the leading shutter blade 4 assumes an inclined state with its right-hand section raised, oppositely to the state near the exposure start.

Secondly, referring to FIGS. 2A to 2C, a description will be made hereinbelow of an actual leading shutter blade driving section according to the embodiment. In this leading shutter blade driving section, in order to make the movements of the respective parts smooth, a fitting play (fitting gaps) is provided in each of the above-mentioned fitting sections, that is, between each of the holes 2a, 3a, 2b, 3b and the corresponding one of the shafts 5, 6 and dowels 7, 8.

Figure 2A:
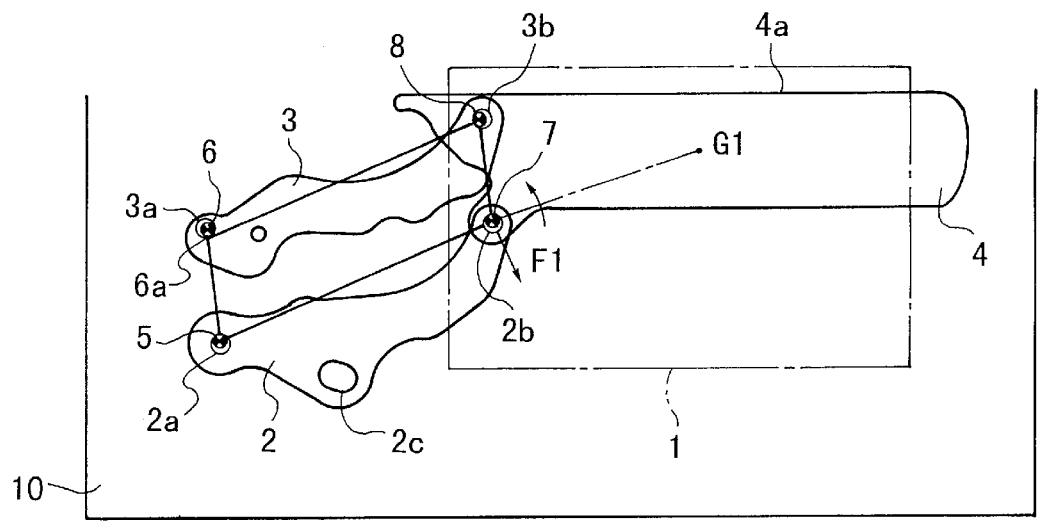
FIGS. 2A, 2B and 2C are illustrations for describing an operation of the leading shutter blade driving section (having a play within a link system) according to the embodiment of the present invention.

In a state near the exposure start shown in FIG. 2A, when a driving force is transferred from a driving lever (not shown) engaging with the driving force transmission hole 2c of the main arm 2 to the main arm 2, a force of rotating clockwise about the center of the shaft 5 is given to the main arm 2, so that a force indicated by an arrow F1 works on the dowel 7 of the leading shutter blade 4 engaging with the hole 2b of the main arm 2 with a fitting play existing therebetween.

When the force indicated by the arrow F1 works, the leading shutter blade 4 tends to stay at that position due to the large-load static frictional force and the inertial force of the leading shutter blade 4 around the center of gravity G1. Further, due to the load (inertial force) of the sub-arm 3, a force for causing the leading shutter blade 4 to rotate counterclockwise works on the dowels 7 and 8.

Here, if the main arm 2 and the sub-arm 3 are assumed to constitute a parallel link, the leading shutter blade 4 (slit-forming edge 4a) takes an inclined state with its right-hand section raised with respect to the end portion of the shutter opening 1, owing to the play within the link system. On the contrary, according to the embodiment of the invention, the main arm 2 and the sub-arm 3 are made to constitute such a non-parallel link that the right-hand section of the leading shutter blade is lowered in the case of the ideal design having no fitting play, and therefore, in the case of the actual design having the fitting play, owing to the above-mentioned force working on the leading shutter blade 4, the leading shutter blade 4 (slit-forming edge 4a) becomes parallel with the end portion of the shutter opening 1. More specifically, the distance between the shafts 5 and 6 is set in accordance with the amount of the fitting gap between each of the holes 2a, 3a, 2b, 3b and the corresponding one of the shafts 5, 6 and dowels 7, 8 fitted therein. As a result, the leading shutter blade 4 travels in parallel with the end portion of the shutter opening 1.

Figure 2B:
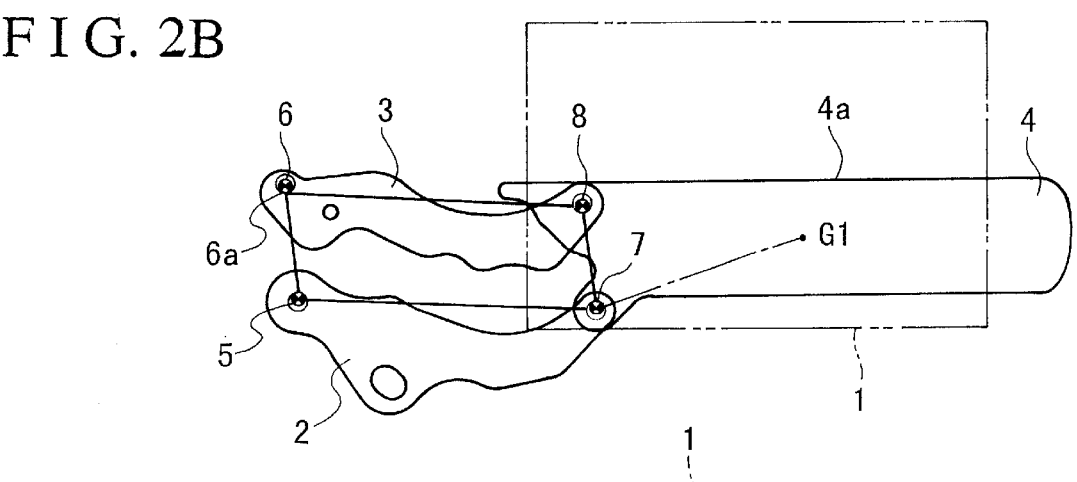
Figure 2C:
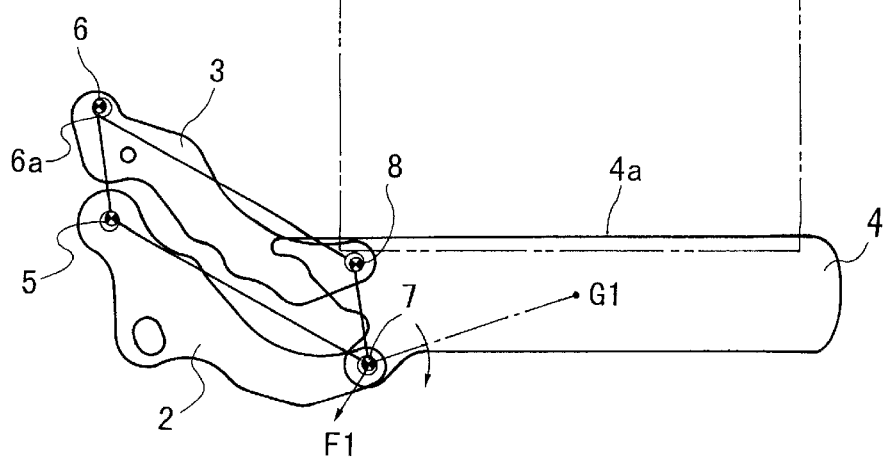

Then, in a state in process of exposure shown in FIG. 2B, the leading shutter blade 4 (slit-forming edge 4a) is kept to be parallel with the end portion of the shutter opening 1, in the same manner as in the case where the main arm 2 and the sub-arm 3 constitute the parallel link.

Subsequently, in a state near the exposure end shown in FIG. 2C, owing to the force indicated by the arrow F1 working from the main arm 2 onto the dowel 7, the leading shutter blade 4 receives the force (the force generated by the load of the sub-arm 3) working from the sub-arm 3 onto the dowel 8 to rotate the leading shutter blade 4 clockwise, and further, receives the centrifugal force working thereon clockwise.

Here, if the main arm 2 and the sub-arm 3 are assumed to constitute a parallel link, the leading shutter blade 4 (slit-forming edge 4a) takes an inclined state with its right-hand section lowered with respect to the end portion of the shutter opening 1, owing to the play within the link system. On the contrary, according to the embodiment of the invention, the main arm 2 and the sub-arm 3 are made to constitute such a non-parallel link that the right-hand section of the leading shutter blade is raised in the case of the ideal design having no fitting play, and therefore, in the case of the actual design having the fitting play, owing to the above-mentioned force working on the leading shutter blade 4, the leading shutter blade 4 (slit-forming edge 4a) terminates the travelling in a state where the parallel condition is maintained with respect to the end portion of the shutter opening 1.

As described above, in the leading shutter blade driving section according to the embodiment, a non-parallel link is constructed in such a way that the position of the shaft 6 serving as the center of rotation of the sub-arm 3 is shifted upward from the position (6a) which would serve as the center of rotation in the case of constructing a parallel link, in accordance with the amount of the fitting gap between the hole 2b and the dowel 7, and/or between the hole 3b and the dowel 8, and/or between the hole 2a and the shaft 5, and/or between the hole 3a and the shaft 6. Accordingly, although the leading shutter blade 4 is inclined with respect to the shutter opening end portion at the traveling start and at the traveling end when taking the ideal design, in the actual case having the play in the fitting sections, the leading shutter blade 4 keeps the parallel condition with respect to the end portion of the shutter opening 1.

Figure 3A:
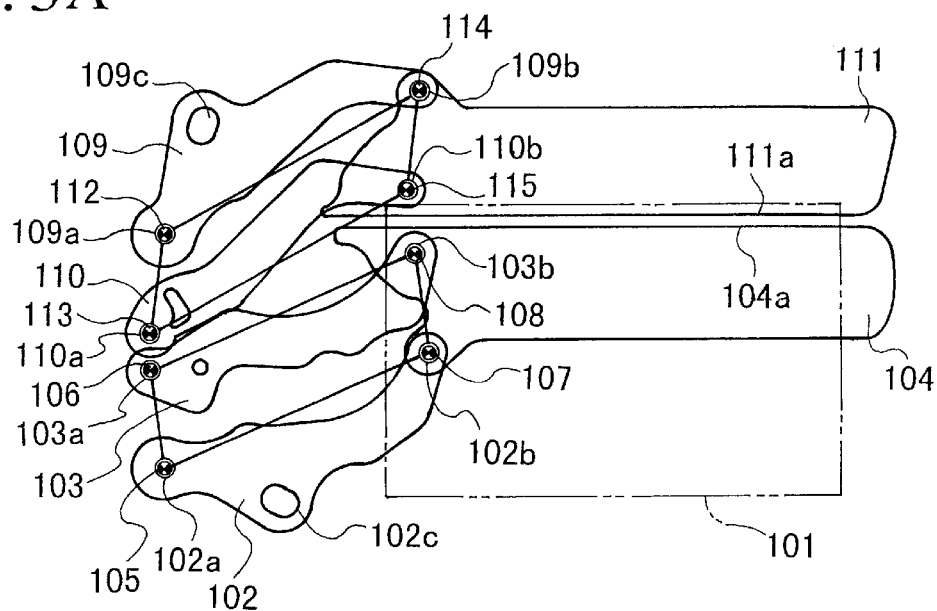
FIGS. 3A, 3B and 3C are illustrations for explaining an operation of a conventional focal-plane shutter device (ideally designed so as not to have a play within a link system).
Figure 3B:
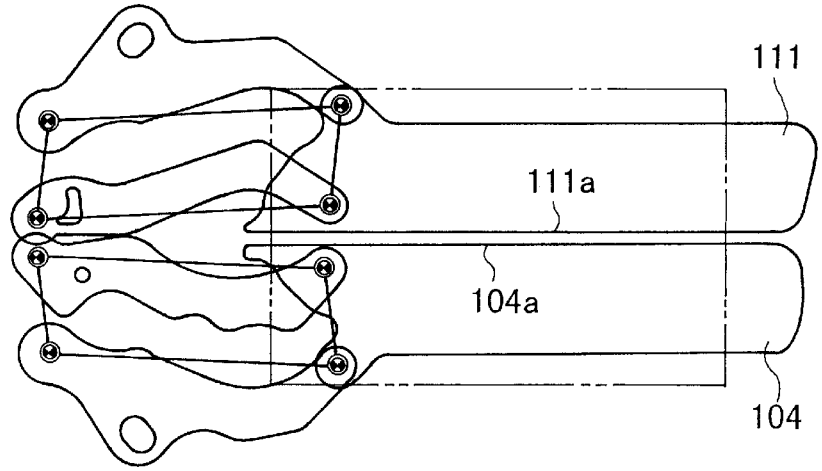
Figure 3C:
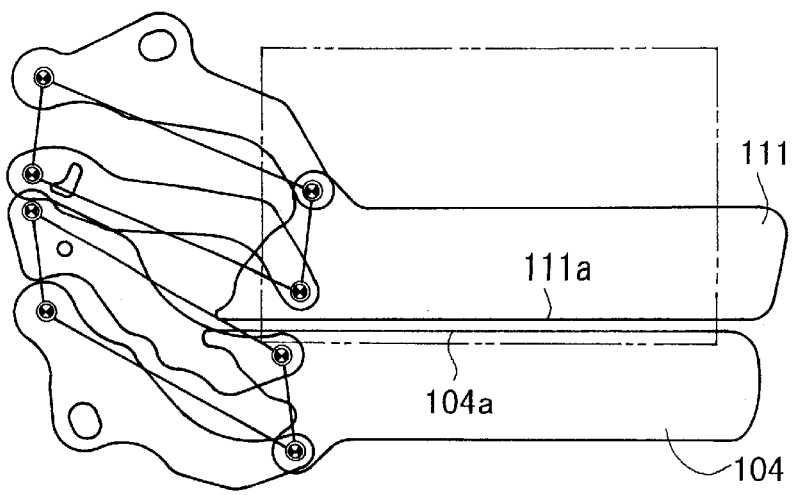
Figure 4A:
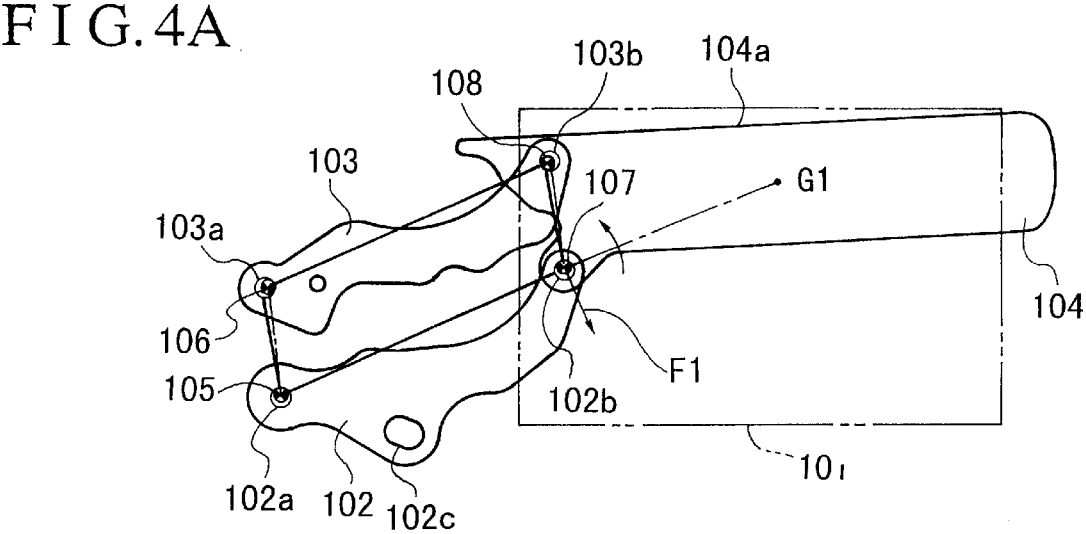
FIGS. 4A, 4B and 4C are illustrations for describing an operation of a leading shutter blade driving section (having a play within a link system) of the conventional focal-plane shutter device.
Figure 4B:
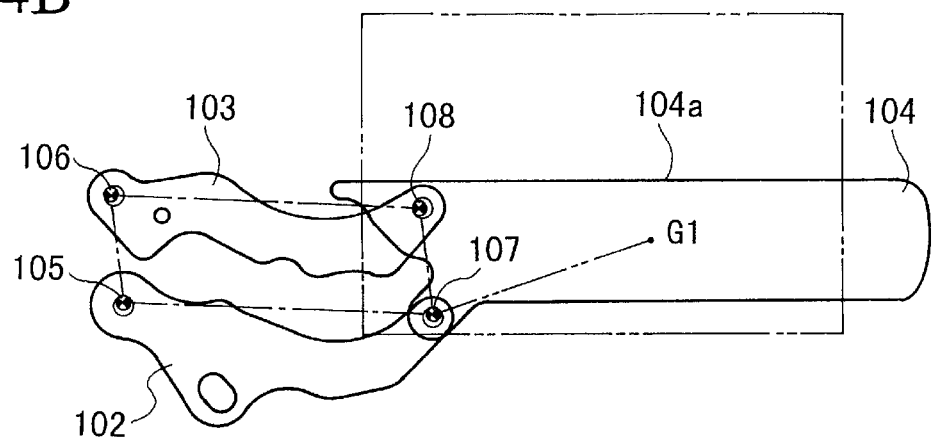
Figure 4C:
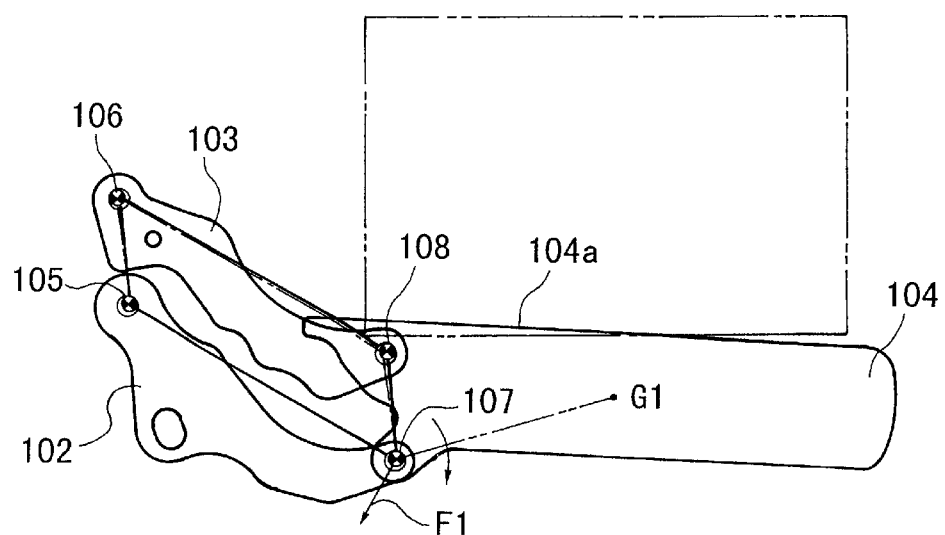
Figure 5A:
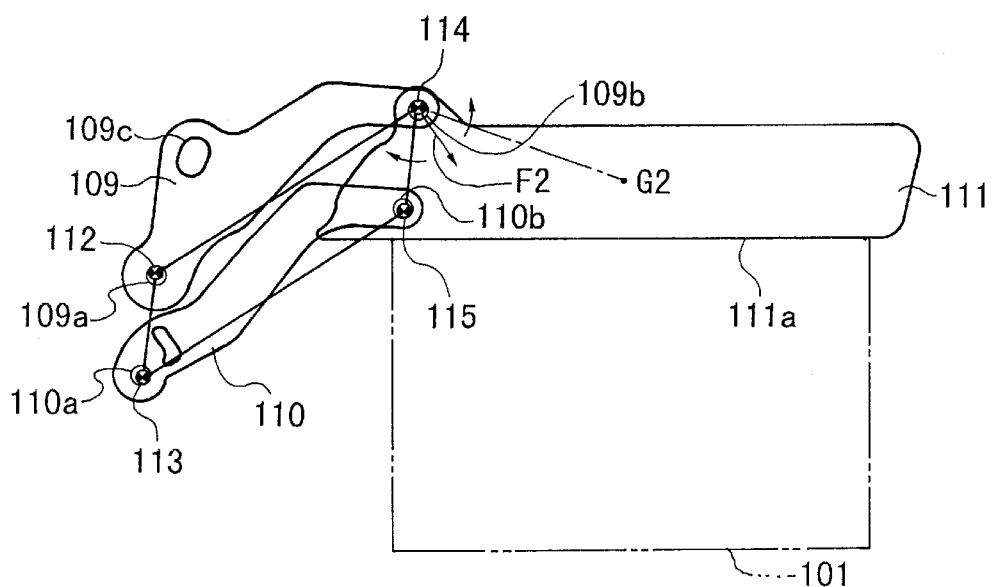
FIGS. 5A, 5B and 5C are illustrations for describing an operation of a trailing shutter blade driving section (having a play within a link system) of the conventional focal-plane shutter device.
Figure 5B:
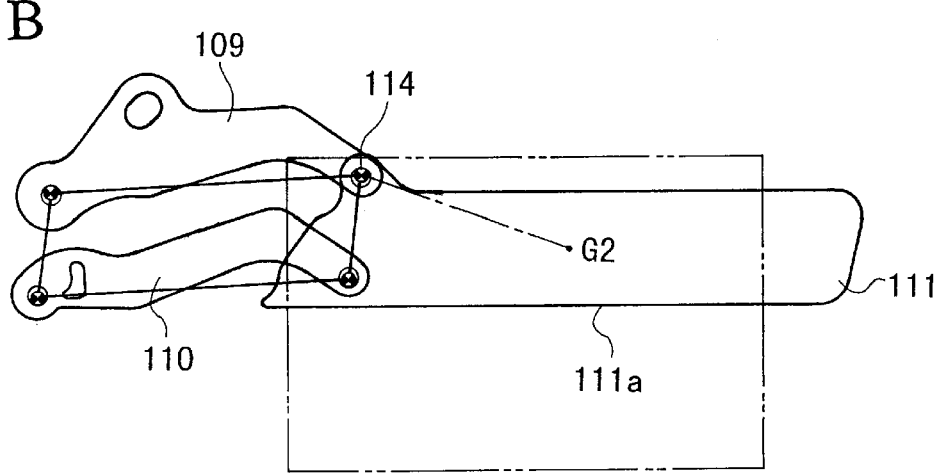
Figure 5C:
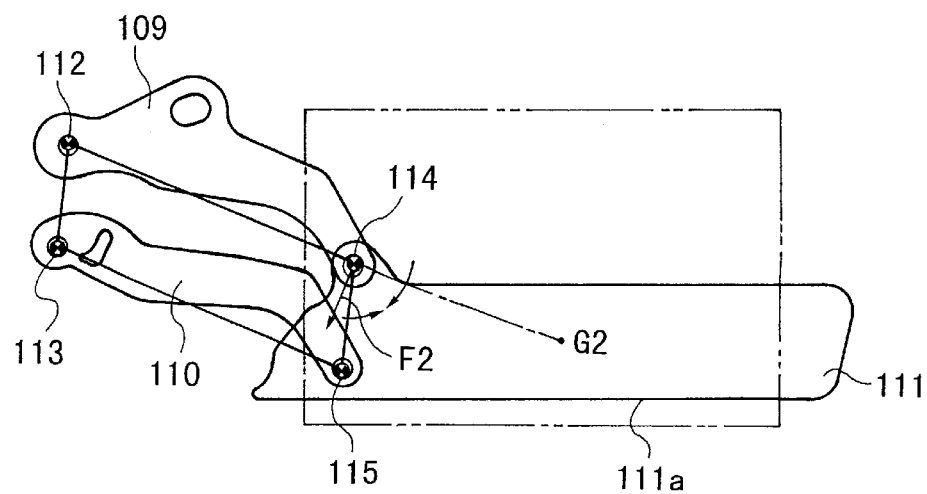

Accordingly, by additionally using a trailing shutter blade driving section similar to the conventional one described before with reference to FIGS. 3A to 3C and SA to 5C, a slit for exposure formed by the leading shutter blade and the trailing shutter blade can always keep the parallel condition during the exposure, with the result that it is possible to realize a focal-plane shutter device with a high exposure accuracy but with no exposure unevenness in the transverse directions.

Incidentally, although in the above-described embodiment the shaft 6 of the sub-arm 3 is shifted so as to construct the non-parallel link, it is also appropriate that the other shaft, for example, the shaft 5 of the main arm 2, is shifted to construct the non-parallel link.

Further, although in the above description of the embodiment the driving link for one of the plurality of leading shutter blade light-shielding blades which forms the exposure slit is made to be a non-parallel link, it is also appropriate that a driving link for the other leading shutter blade light-shielding blade is likewise made to be a non-parallel link, or is made to be a parallel link.

Still further, although in the above-described embodiment the leading shutter blade is made to be in parallel with the shutter opening end portion to maintain the parallelism of the slit, it is also appropriate that the driving link for the leading shutter blade is made to be a parallel link while the driving link for the trailing shutter blade is made to be a non-parallel link, so that the inclination of the leading shutter blade with respect to the shutter opening end portion is made to coincide with the inclination of the trailing shutter blade, thereby maintaining the parallelism of the slit.

It should be understood that the foregoing relates to only a preferred embodiment of the present invention, and that it is intended to cover all changes and modifications of the embodiment of the invention herein used for the purpose of the disclosure, which do not constitute departures from the spirit and scope of the invention.

What is claimed is:

1. A shutter device comprising:
   a shutter blade;
   a base plate;
   a first arm member whose one end portion is rotatably fitted to said shutter blade and whose other end portion is rotatably fitted to said base plate, an engagement between said first arm member and said shutter blade is effected by holes larger than diameters of shafts, providing a predetermined amount of clearance in said engagement; and
   a second arm member whose one end portion is rotatably fitted to said shutter blade and whose other end portion is rotatably fitted to said base plate, an engagement between said second arm member and said shutter blade is effected by holes larger than diameters of shafts, providing a predetermined amount of clearance in said engagements,
   wherein a distance between the center of rotation of said first arm member with respect to said shutter blade and the center of rotation of said second arm member with respect to said shutter blade is set to be different from a distance between the center of rotation of said first arm member with respect to said base plate and the center of rotation of said second arm member with respect to said base plate.

2. A shutter device according to claim 1, wherein the distance between the center of rotation of said first arm member with respect to said base plate and the center of rotation of said second arm member with respect to said base plate is set to be longer than the distance between the center of rotation of said first arm member with respect to said shutter blade and the center of rotation of said second arm member with respect to said shutter blade.

3. A shutter device according to claim 1, wherein a difference between the distance between the center of rotation of said first arm member with respect to said shutter blade and the center of rotation of said second arm member with respect to said shutter blade and the distance between the center of rotation of said first arm member with respect to said base plate and the center of rotation of said second arm member with respect to said base plate is set on the basis of the predetermined amount of clearance.

4. A shutter device according to claim 3, wherein said shutter blade is a leading shutter blade.

5. A shutter device comprising:
   a shutter blade;
   a base plate;
   a first arm member whose one end portion is rotatably fitted to said shutter blade and whose other end portion is rotatably fitted to said base plate in respective holes larger than diameters of shafts, providing a predetermined amount of clearance in said fittings; and
   a second arm member whose one end portion is rotatably fitted to said shutter blade and whose other end portion is rotatably fitted to said base plate in respective holes larger than diameters of shafts, providing said predetermined amount of clearance in said fittings, wherein a degree of non-parallelism between said first arm member and said second arm member is set in accordance with the predetermined amount of clearance.

6. A shutter device according to claim 5, wherein said shutter blade is a leading shutter blade.

* * * * *

UNITED STATES PATENT AND TRADEMARK OFFICE
CERTIFICATE OF CORRECTION

PATENT NO. : 6,123,467
DATED : September 26, 2000
INVENTOR(S) : Fumio Shimada

It is certified that error appears in the above-identified patent and that said Letters Patent is hereby corrected as shown below:

<u>Column 7</u>,
Line 41, delete "SA to 5C" and insert -- 5A to 5C --.

Signed and Sealed this

Nineteenth Day of March, 2002

*Attest:*

JAMES E. ROGAN
*Attesting Officer*  *Director of the United States Patent and Trademark Office*